Sept. 20, 1960  R. LUCIEN  2,953,393
TRIM CORRECTION DEVICE
Filed Feb. 4, 1959  2 Sheets-Sheet 2

United States Patent Office
2,953,393
Patented Sept. 20, 1960

2,953,393
TRIM CORRECTION DEVICE
René Lucien, 56 Blvd. Maillot, Neuilly sur Seine, France Filed Feb. 4, 1959, Ser. No. 791,175

Claims priority, application France Feb. 5, 1958

5 Claims. (Cl. 280—124)

The invention relates to automatic devices of the type which act to correct the trim of a vehicle and establish a constant mean value for the height of the associated frame above the ground, irrespective of the variations of the load on the vehicle, by increasing or reducing the pressure of a pneumatic or oleo-pneumatic suspension system.

These automatic controls should preferably be such that they react only to variations in trim resulting from variations of the load, but in no event should they come into operation due to oscillations caused by irregularities of the road.

An object of the present invention is to provide an improved automatic device for the correction of trim which, when combined with a pneumatic or oleo-pneumatic system, is of the type in which variations of load are transmitted by a pair of springs to a lever which controls a distributor adapted to put pneumatic chambers of the suspension system in association with a reservoir or with the atmosphere by the action of valves of the so-called inflation and deflation types respectively.

In accordance with a first feature of the present invention, the action of the distributor is controlled by a dash-pot with hydraulic braking action, which prevents any movement at substantial speeds; that is to say the distributor does not react to rapid oscillations set up by the uneven nature of the road.

In the automatic devices of the type considered, when the vehicle is stationary and there are no passengers, the trim of the vehicle is automatically restored by deflation of the suspension jacks due to the action of the distributor. When the vehicle starts off again the trim must be restored by a fresh inflation corresponding to the minimum load of the weight of the driver. Stopping the vehicle and discharging the passengers thus results in an expenditure of air and in a useless loss of power.

In order to avoid this drawback, a further feature of the invention consists of interposing a non-return valve in the deflation mechanism in series with the deflation valve. This non-return valve is normally kept open by the pressure which exists in the suspension cylinders, but it closes under the action of the spring when this pressure decreases in the cylinders and falls to a value corresponding to the load due to, generally, the cumulative load of the passengers including the driver. The spring of this non-return valve is very strictly calibrated so as to comply with these conditions of load.

Since this valve prevents deflation below a selected pressure when the vehicle is stopped, there will not be any inflation required when initiating operation of the vehicle if only the driver and the passenger or passengers get into the vehicle due to calibration of the spring.

A device for the correction of trim according to the invention is illustrated in the accompanying drawings.

Figure 1:
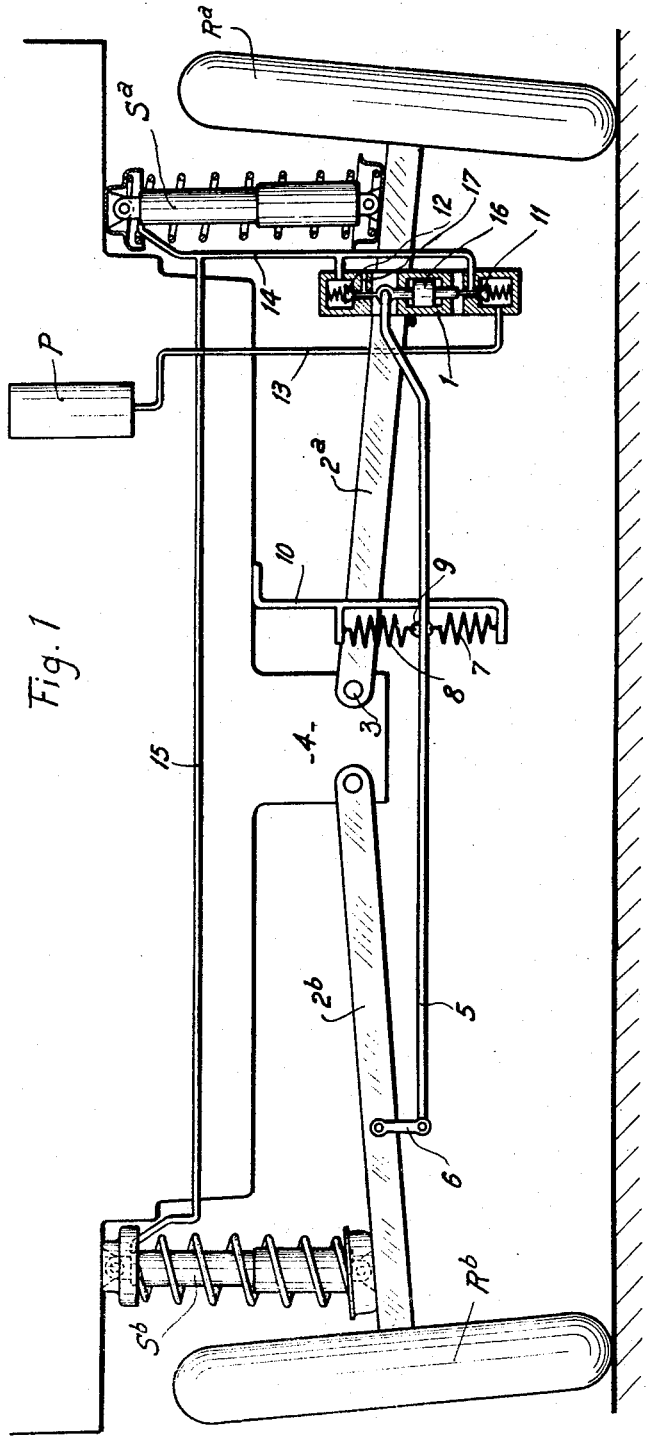
Fig. 1 is a general view of the device in front elevation, with the distributor shown in cross-section.

In Fig. 1, the air distributor 1 is fixed on a half-axle 2a pivotally mounted at 3 on the chassis 4 and carrying the wheel Ra; the other wheel is given the reference Rb.

The distributor 1 is controlled by a lever 5 pivoted on the other half-axle 2b through the intermediary of a connecting rod 6. Two pressure medium systems such as pneumatic or oleo-pneumatic suspension systems Sa and Sb couple the respective half-axles to the chassis of the vehicle.

Two traction springs 7—8 which are balanced and act in opposition to each other are fixed on the one hand to a common point or fixture 9 on the lever 5 and on the other hand to a member 10 which is rigidly fixed to the chassis.

Assuming that the normal trim of the vehicle is exactly as shown in the drawing, it can be seen that any variation in trim gives rise to an unbalance of the springs 7—8. In restoring their balance, these springs move the lever 5 in one direction or in the opposite direction, depending on the direction of variation from the initial trim.

This displacement of the lever actuates the distributor. The latter comprises a lower valve or so-called inflation valve 11, and an upper valve 12 which is the deflation valve. These valves are in communication with the reservoir P of air under pressure through the connection or pipe 13, and with the suspension systems Sa—Sb through the couplings or pipes 14—15. Between the valves is mounted a small dash-pot jack or movable member 16, adapted to provide hydraulic braking, on which is pivotally attached the extremity of the lever 5. An orifice 17 in distributor 1 communicates with the atmosphere.

The operation of this automatic device for correction of trim is as follows:

Assuming that the vehicle is stationary, the device is in equilibrium at the trim for no-load. When passengers get into the vehicle, the body moves downwards with respect to the half-axle. The springs 7—8 are stretched downwards and the lever 5 opens the inflation valve 11 through the intermediary of the dash-pot 16 and thus puts the suspensions Sa and Sb in communication with the reservoir P. The vehicle rises and regains its trim; the springs 7—8 are again in balance. The lever 5 returns to its normal position and the inflation valve closes.

With the vehicle being thus loaded and at its correct trim, if one or more passengers get out, the body rises with respect to the axles; the tension springs 7—8 act on the dash-pot 16 in the direction which causes the deflation valve 12 to open. The suspensions Sa—Sb are put into communication with the atmosphere through the orifice 17. The body sinks down, the springs 7—8 come again into balance and the valve 12 closes when the trim is restored.

Figure 2:
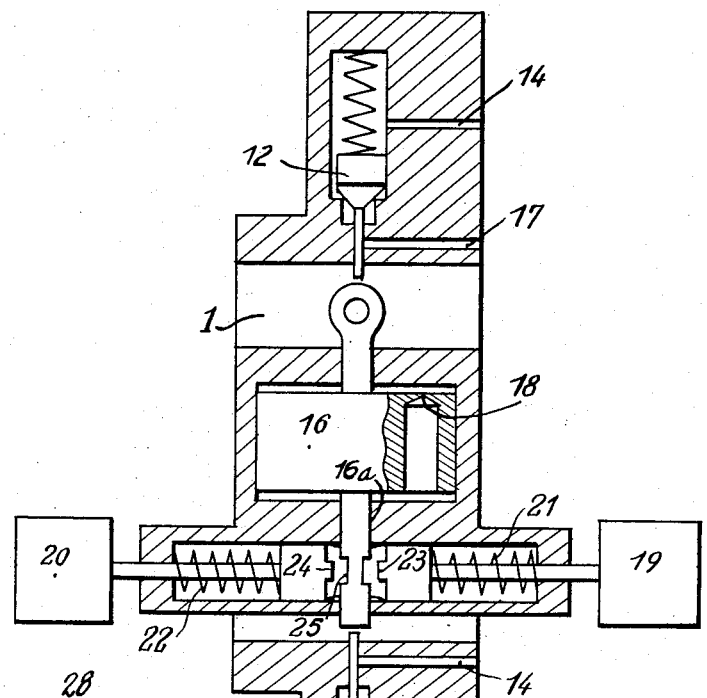
Fig. 2 is a view on a larger scale of the distributor with its dash-pot.

Finally, in accordance with an important feature of the invention, when the vehicle is running and irregularities of the road cause oscillations of the body, these oscillations do not act on the distributor, since the hydraulic braking effected by narrow orifice 18 in the dash-pot 16 (Fig. 2) prevents any movement of the dash-pot at high speeds: the pivotal mounting of the lever 5 on the dash-pot then behaves like a fixed point in respect of these rapid oscillations. While this is not a necessity, there is an advantage to be gained from the use of a kinetic hydraulic braking, the action of which is proportional to the square of the speed, in this way: the control of the distributor can only come into action at the low speeds employed during the loading or unloading of the vehicle.

It is also an advantage to place the springs 7—8 as close as possible to the axis of the vehicle in order to prevent the downward movement of one side, due to a turning, from acting on the distributor 1.

It is however sometimes difficult to carry out this mounting. The auxiliary device shown in Fig. 2, and incorporated in the distributor 1 then avoids the drawback referred to. On each side of the distributor 1 are mounted two rigidly-fixed weights 19—20 which are normally maintained by aligned springs 21—22 in a position of balance such that the studs 23—24 rigidly fixed on the plates are located outside a groove 25 formed in the shaft or movable member 16a of the dash-pot 16.

When the vehicle negotiates a turn, the displacement of the said weights due to centrifugal force causes one or the other of the studs 23—24 to become engaged in the groove 25, thus preventing movement of the dash-pot and locking the distributor. During the course of this movement, the spring opposite to that of the stud which has come into action is compressed and subsequently returns the weight to its position of balance after the turning has been accomplished.

The application of the invention does not give rise to any particular problem for the case of a straight axle.

On the other hand, in the case of an articulated axle, as shown in the drawing, a correction is made for asymmetrical compressions, corresponding to the mean compression which is precisely that which affects the springs 7—8.

Figure 3:
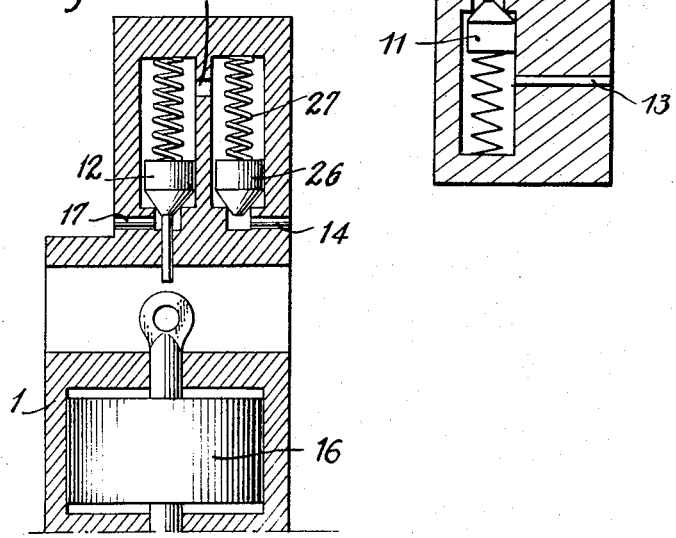
Fig. 3 shows a longitudinal cross-section of the combination of the non-return valve and the deflation valve.

Fig. 3 illustrates the feature of the invention by means of which an unnecessary expenditure of air after the vehicle is stopped can be avoided. There can be seen in this figure the non-return or one-way valve 26 mounted in series with the deflation valve 12 and controlled by the calibrated spring 27. The chamber of this non-return valve is in communication through the conduit 28 with the chamber of the deflation valve 12. As in the case of Figs. 1 and 2, the conduit 17 is open to the atmosphere; the conduit 14 is connected to the pneumatic chambers of the suspension cylinders 5a and 5b.

This valve which can be kept open by the pressure which exists in the suspension cylinders, closes under the action of its spring when this pressure falls to a predetermined value, corresponding in principle to the load of the driver.

What I claim is:

1. An automatic device for the correction of trim of a vehicle and adapted for operation with a pressure medium suspension system, the vehicle having suspending and suspended portions, said device comprising: a source of fluid under pressure; a distributor including a movable member controlling the operation of said distributor; in said distributor, two valves, one for inflation, the other for deflation, the inflation valve being adapted to put said source in communication with said suspension system, the deflation valve being adapted to put said system into communication with the atmosphere; means responsive to variations of the load of the vehicle and selectively actuating the said valves; a one-way valve mounted in series with the deflation valve between the latter and said system; and a return spring acting on said one-way valve and calibrated to a predetermined pressure; said means comprising: a lever pivotally mounted on the one hand on the suspending portion of the vehicle, and coupled to and acting on the other hand on the moving member of said distributor; a pair of springs in balanced opposition on each side of said lever; and means for producing an unbalance of the said springs as a function of variations of the load on the vehicle.

2. An automatic device for the correction of trim of a vehicle and adapted for operation with a pressure medium suspension system, the vehicle having suspending and suspended portions, said device comprising: a source of fluid under pressure; a distributor including a movable member controlling the operation of said distributor; in said distributor two valves, one for inflation, the other for deflation, the inflation valve being adapted to put said source in communication with said suspension system, the deflation valve being adapted to put said system in communication with the atmosphere; between said valves a dash-pot including a movable member in the distributor and controlling operation of said valves; means responsive to variations on the load of the vehicle and actuating the movable member of said dash-pot depending on the variations of the load; said means comprising: a lever pivotally mounted on the one hand on the suspending portion of said vehicle and on the other hand on the moving member of said dash-pot; a pair of springs in balance and acting in opposition on each side of said lever and means for causing an unbalance of said springs as a function of variations of the load of the vehicle.

3. A device as claimed in claim 1 wherein said vehicle comprises two half-axles, said distributor being fixed on one of the half-axles, said lever being coupled to the other of the half-axles and to the movable member of said distributor; said device further comprising a fixture on said lever coupled to each of said springs at respective ends of the springs, means connecting the other ends of the springs to the suspended portion of the vehicles, and a rod coupling said lever to said other half-axle.

4. A device as claimed in claim 2 comprising a one-way valve coupled between said system and the deflation valve and a spring of predetermined strength urging said valve closed and acting in opposition to the pressure in said system.

5. A device as claimed in claim 1 comprising horizontally movable weights operatively associated with the movable member of the distributor and adapted to engage the said movable member and lock the same in position, and springs operatively associated with and urging the weights away from said movable member, the weights being arranged transversely of said vehicle and responding to centrifugal forces with the vehicle turning.

References Cited in the file of this patent

UNITED STATES PATENTS

| | | |
|---|---|---|
| 2,844,384 | Jackson | July 22, 1958 |
| 2,879,795 | Rossman | Mar. 31, 1959 |